United States Patent [19]

Bolon

[11] 3,890,176

[45] June 17, 1975

[54] METHOD FOR REMOVING PHOTORESIST FROM SUBSTRATE

[75] Inventor: Donald A. Bolon, Scotia, N.Y.

[73] Assignee: General Electric Company, Schenectady, N.Y.

[22] Filed: Dec. 17, 1973

[21] Appl. No.: 425,245

Related U.S. Application Data

[63] Continuation of Ser. No. 281,764, Aug. 18, 1972, abandoned.

[52] U.S. Cl. .......................... 156/2; 134/20; 134/31; 134/39; 156/8; 156/17

[51] Int. Cl. .......................... B44c 1/22

[58] Field of Search .......................... 252/79.1; 156/2, 3, 8, 156/11, 13, 17; 96/36.2; 134/20, 31, 38–40

[56] References Cited

UNITED STATES PATENTS

| | | | |
|---|---|---|---|
| 2,443,373 | 6/1948 | Borsoff | 134/20 |
| 3,664,899 | 5/1972 | Wright et al. | 156/8 |
| 3,767,490 | 10/1973 | Alberts | 156/2 |

OTHER PUBLICATIONS

IBM Technical Disclosure Bulletin, Vol. 10, No. 8, Jan. 1968, Photoresist Removal In Ozone-Containing Atmospheres by Burrage et al., p. 1260.

*Primary Examiner*—William A. Powell
*Attorney, Agent, or Firm*—William A. Teoli; Joseph T. Cohen; Jerome C. Squillaro

[57] ABSTRACT

A solvent free method is provided for effecting the complete removal of photoresist from a substrate at temperatures up to about 260°C, utilizing in combination with a mixture of oxygen and ozone, an ultraviolet radiation discharge lamp capable of generating at least 100 milliwatts per square centimeter of ultraviolet light on the substrate surface.

6 Claims, 2 Drawing Figures

RATE OF PHOTORESIST REMOVAL AT 250° C. SURFACE TEMPERATURE

METHOD FOR REMOVING PHOTORESIST FROM SUBSTRATE

Figure 1:
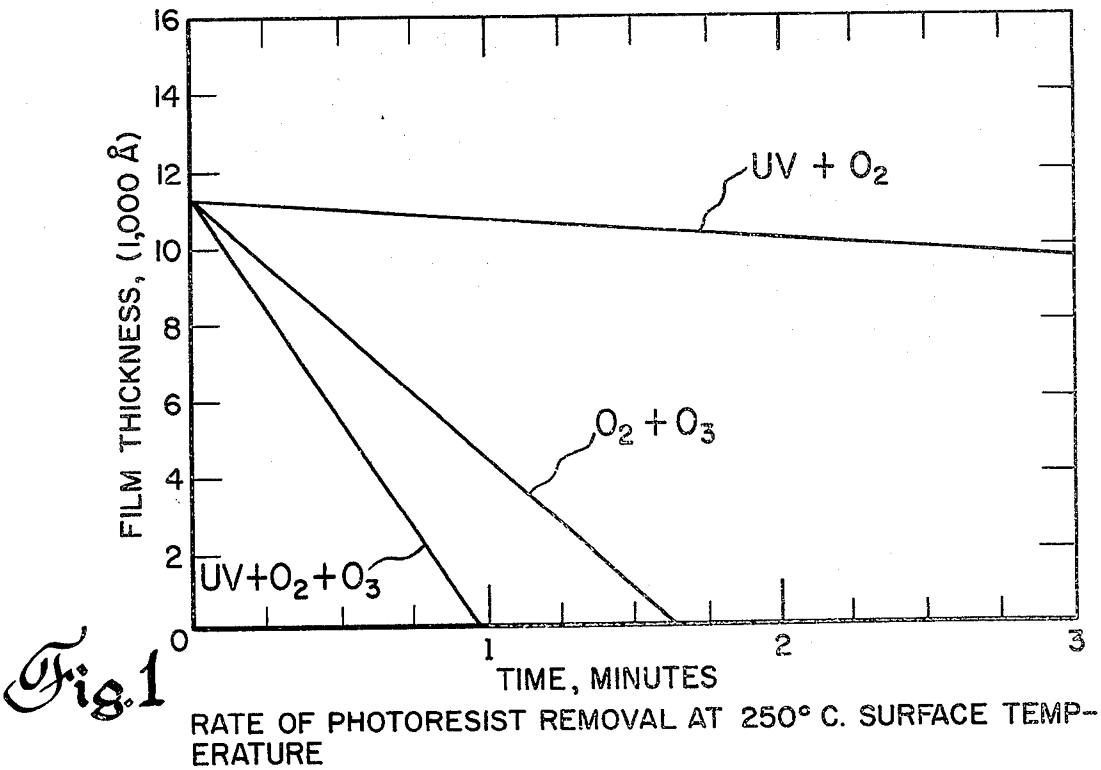

This is a continuation of application Ser. No. 281,764, filed Aug. 18, 1972 now abandoned.

The present invention relates to a solvent free method of completely removing photoresist from a substrate.

Prior to the present invention, a method of removing carbon and carbonaceous matter from a substrate such as an internal combustion engine part, was provided by Borsoff as shown in U.S. Pat. No. 2,443,373. Borsoff taught that carbonaceous materials could be removed from various substrates at temperatures between about 150°C to 260°C in an oxygen and ozone atmosphere, as compared to a temperature of 400°C required in an oxygen atmosphere free of ozone. Heat is generated in the Borsoff apparatus by a hot plate situated beneath a perforated substrate support member in an enclosed system.

Although Borsoff's method can provide effective carbonaceous material removal rates, it is not suitable for continuous operation. In order to operate on a continuous basis, the carbonaceous substrates would have to be preheated before entering the oxygen and ozone atmosphere since a hot plate would not provide sufficient heat to raise the temperature of substrates quickly enough. The oxygen and ozone atmosphere also would likely have to be maintained at a sufficiently high temperature to minimize undue substrate cooling. Excessive heating of the ozone-oxygen mixture results in premature ozone breakdown, which would interfere with the results desired.

A method which substantially eliminates the problem of preheating substrates to effect the removal of carbonaceous materials therefrom is shown by A. N. Wright et al. U.S. Pat. No. 3,664,899, assigned to the same assignee as the present invention. Wright et al.'s method is based on the use of ultraviolet radiation in an oxygen containing atmosphere. There is no external heating means employed such as the hot plate utilized in Borsoff's method. Complete removal of organic polymeric film is achieved by Wright et al utilizing an ultraviolet light source capable of emitting ultraviolet light having a wavelength of from 1,800 to 3,500 Angstroms and an intensity of at least 100 milliwatts per square centimeter.

Wright et al.'s ultraviolet light source, such as a medium vapor pressure mercury lamp, combines the capability of heating substrates through the absorption of radiant energy plus heat generated during photodepolymerization. In addition, while sufficient heat is generated by the lamp to effect film removal, the radiant energy does not alter the temperature of the oxygen containing gas in the surrounding atmosphere. Experience has shown, however, that even with pure oxygen, the rate of removal in the method of Wright et al. does not substantially exceed several hundred Angstroms per minute. Although such removal rate is adequate for a variety of applications, it does not provide an adequate rate of removal for semiconductor fabricators interested in the continuous removal of negative photoresist from wafers. For example, removal requirements of semi-conductor fabricators can be as high as 10,000 Angstroms per minute.

The present invention is based on the discovery that a surprising improvement in rate of removal of photoresist from a substrate is achieved, as shown in FIG. 1, when an ultraviolet light source, such as a medium vapor pressure mercury lamp is employed in combination with a mixture of ozone and oxygen, as compared to the use of such ultraviolet light source and oxygen. When used hereinafter, the term "ultraviolet radiation discharge lamp" will signify a lamp having an envelope of clear fused silica with ultraviolet transmission characteristics of from about 1,800 A to 3,500A, containing mercury vapor at a pressure of from about 0.5 to 20 atmospheres which is operated at a loading of from 20–100 watts/cm. However, other sources of ultraviolet radiation, such as xenon, metallic halide, metallic arc, etc. having radiant energy transmission characteristics equivalent to the mercury vapor lamp defined above also can be used. A more detailed description can be found in High Pressure Vapor Discharge, W. Ellenbas, North Holland Publishing Company, Amsterdam (1951). A significant improvement in the rate of photoresist removal also is shown in FIG. 1, when ultraviolet radiation is employed in combination with oxygen and ozone as compared to an oxygen and ozone mixture at the same surface temperature in the absence of ultraviolet radiation.

There is provided by the present invention, a method for effecting the complete removal of carbonaceous material from substrate surface at temperatures up to about 260°C in a reaction zone having an oxygen containing atmosphere with at least ¼% by weight ozone, which involves the improvement of using radiant energy in said reaction zone to maintain the temperature at the interface of the substrate and the oxygen containing atmosphere to at least about 200°C, where the radiant energy is generated by an ultraviolet radiation discharge lamp capable of emitting ultraviolet radiation at a wavelength of from 1800 to 3500 Angstroms and an intensity of at least 100 milliwatts per square centimeter.

Among the organic photoresists which can be removed from various substrates by the method of the present invention, are included the organic materials shown in application of Donald A. Bolon, Ser. No. 888,379, filed Dec. 29, 1969, now abandoned and assigned to the same assignee as the present invention. For example, there are included, $$H\left[C\equiv C-\left(CH_2O\right)_m-R-\left(OCH_2\right)_m-C\equiv C\right]_n$$

where $m$ is 0 or 1 and $n$ is an integer and is at least 10. When $m$ is 0, the acetylenic polymers are polymers of diethynyl alkanes (alkadiynes), diethynylarenes or diethynylhaloarenes, i.e., R is alkylene, arylene, which includes alkyl-substituted haloarylene. The diacetylenic monomers of the alkylene series are readily made by reaction of sodium acetylide and an alkylene dihalide. The diacetylenic monomers of the arylene and haloarylene series are readily made by halogenation followed by dehydrohalogenation of the corresponding divinylarenes, e.g., dinvinylbenzenes, divinyltoluenes, divinylnaphthalenes, etc. or diacetylarenes, diacetylbenzenes, diacetyltoluenes, diacetylxylylenes, diacetylnaphthalenes, diacetylanthracenes, etc.

The photosensitizers which can be used in combination with the above polyacetylene are any materials capable of absorbing the actinic radiation to which it is exposed and be capable of using the energy so absorbed to accelerate the cross-linking of the polymer in which it is incorporated, such as various dyes, carbonyl compounds, for example, ketones, aldehydes, anhydrides, quinones, etc., 1,4-diethynylbenzene, etc. in the range of from 0.1 to 10 percent by weight based on the weight of acetylenic polymer and photosensitizer.

In addition to the above acetylenic polymers, there also can be employed in the practice of the invention, organic polymers substituted with unsaturated imido radicals as disclosed in the applications of Klebe and Windish, Ser. Nos. 838,322, and 846,623, now abandoned, filed July 1, 1969, and assigned to the same assignee as the present invention. There are included by these unsaturated imido-substituted organic polymers, polyaryleneoxides, polycarbonates, polyesters, polyamides, polystyrene, etc. Additional photosensitive polymers which can be used are shown by Merrill U.S. Pat. No. 2,948,610 directed to azide polymers, Minsk U.S. Pat. No. 2,725,372 directed to unsaturated esters of polyvinylalcohol, Eastman Kodak Photoresist KPR and KMER, cinnamoyl-polystyrene resins, etc. Other photosensitive materials are described in Light-Sensitive Systems, Chapter 4, pages 137–155, by Jaromir Kosar, John Wiley & Sons, Inc., New York (1965). For example, polyvinyl cinnamate, styrene maleic-anhydride copolymer with cinnamide, N-(cinnamolylphenyl)urethane derivatives, partially hydrolyzed cellulose acetate with 3- or 4-($\alpha$-cyanocin-amido)phthalic anhydride, soluble polyamides, light-sensitive cinnamylidene arylvinylaceto-phenone, etc., polymers shown in U.S. Pat. No. 2,908,667 Williams, Chalcone-type compounds, such as benzolacetophenone, etc.

In addition to the above reformed organic polymers which can be applied to various substrates in the form of an organic solvent solution, or in the form of a melt, either by spraying or dipcoating techniques, spinning techniques, etc., there also can be removed within the scope of the method of the present invention, organic polymer films made by the surface photopolymerization of various photopolymerizable organic monomers in vaporous form, such as dienes, for example butadiene, 1,5-hexadiene, 2,4-hexadiene, hexachlorobutadiene, tetrafluoroethylene, ethylene, methylmethacrylate, N-phenylmaleimide, phenol, pyromellitic dianhydride, acrylonitrile, etc., and other materials as described in Wright et al. U.S. Pat. No. 3,522,226, assigned to the same assignee as the present invention.

Substrates which can be employed in the practice of the invention, include any etchable material such as metal, metalloid or oxide thereof, such as gold, silver, aluminum, tin, copper, silicon oxide, etc.

In accordance with the method of the present invention, complete removal of organic photoresist from a substrate, such as on a silicon wafer can be effected with radiant energy including ultraviolet light at a wavelength of from between about 1800A to about 3500A in an oxygen-ozone atmosphere.

In view of the toxicity of the ozone in the oxygen-ozone atmosphere it is preferred to employ a closed system or one which is shielded from the operator allowing for either continuous or intermittent operation. One form of apparatus is shown for example in FIG. 2 in U.S. Pat. No. 3,664,899, which is incorporated herein by reference.

To achieve effective results with the parameters of the method of the present invention, it has been found desirable to provide for a rate of film removal greater than 1,000 A per minute and up to about 10,000 A per minute or higher. It has been found that in particular situations removal greater than 10,000 A per minute, for example, as high as 15,000 A per minute, can be obtained depending upon the temperature of the substrate or the surface of the photoresist under direct exposure to ultraviolet radiation.

Various factors have been found to influence the rate of removal of the photoresist. For example, the concentration of the ozone in the oxygen atmosphere; temperature at the surface of the organic photoresist; the intensity of radiant energy; the wavelength of the ultraviolet radiation, the nature of the organic photoresist being removed, etc. Experience has shown for example, that optimum results can be achieved if the organic photoresist is exposed to ultraviolet radiation in the presence of an oxygen atmosphere containing from ¼% to 2% ozone, and preferably from ½% to 2% based on the weight of the oxygen-ozone mixture. Ozone can be introduced into the oxygen mixture by passing oxygen gas through an ozonizer, such as electric discharge type, for example a Welsbach Ozonizer T816, etc. If desired, liquid ozone can be utilized as the source but because of safety reasons the generation of the ozone insitu in the presence of oxygen is preferred. The pressure at which the oxygen-ozone mixture can be employed is preferably between 740 torr to 780 torr, however, pressures as little as 700 torr to as high as 800 torr, will provide for effective results.

The temperature at which the most effective rate of removal is achieved is between about 200°C to 260°C. Higher and lower temperatures also provide for effective results depending upon the ability of the substrate to resist alteration in properties. The temperature can be satisfactorily controlled by employing ultraviolet radiation generated by a medium vapor pressure mercury lamp as previously defined at various distances to provide for at least 100 milliwatts per square centimeter on the surface of the photoresist. Surface temperature can be measured by means of a thermocouple placed on the surface in the radiation flux. In order to maximize the rate of removal, ultraviolet radiation having a wavelength in the range of from 1800 A to 3500 A and preferably 1849 to 3000 A can be employed. It is to be understood by those skilled in the art that the term "radiant energy" includes infrared and visible light which contribute to the effectiveness of the invention and inherently generated by the ultraviolet radiation discharge lamp as previously defined. The intensity of the flux can be readily varied by the rating of the lamp employed, the distance of the lamp is utilized from the surface of the organic polymeric film, etc. Determination of radiation intensity can be made with the use of thermopile as described by R. G. Johnston and R. P. Madden, Applied Optics, Volume 4, No. 2 (December 1965), page 1574.

By the method of the present invention, organic polymeric films having thicknesses in the range of up to about 1 mil or higher can be effectively removed. Removal of organic polymeric film in accordance with the invention can signify a carbon free surface as established by the method of Auger Emission Analysis, described by L. A. Harris, *Journal of Applied Physics*, Vol. 39, page 1419 (1968).

In order that those skilled in the art will be better able to practice the invention, the following examples are given by way of illustration and not by way of limitation. All parts are by weight.

EXAMPLE 1

A silicon wafer having a diameter of about 1¼ inches and a uniform silicon oxide coating of about 1 micron was placed in a photoresist spinner and treated with a 6 percent solution of a polyacetylene in a solvent mixture of toluene and xylene. The silicon wafer was spun at about 2000 rpm to produce a resist thickness of about 1500 A. The polyacetylene employed in the polymer solution was a copolymer consisting essentially of about 97 mole percent of 2,2-bis(4'-propargyloxyphenylpropane) and about 3 mole percent of 1,4-diethynylbenzene. The treated silicon wafer was dried in air at room temperature for about 30 minutes utilizing a stream of nitrogen to facilitate the evaporation of solvent. There was obtained a silicon wafer composite having a silicon base, a silicon oxide coating of about 1 micron in thickness, and an upper polyacetylene layer at a thickness of about 1500 Angstroms.

Figure 2:
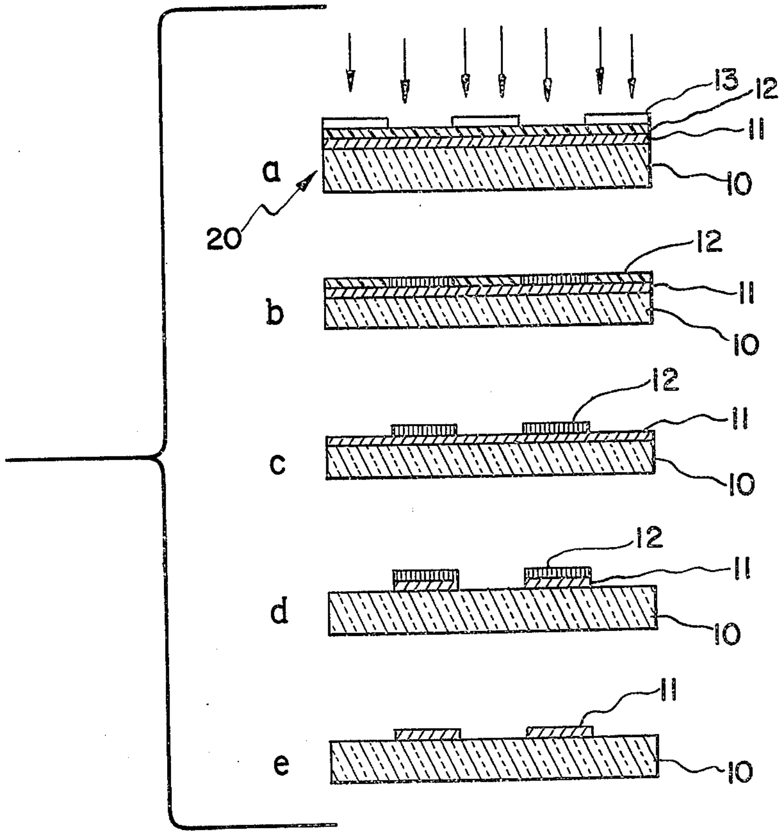

The silicon wafer composite was then placed in an exposure station and a contact mask was clamped in contact with the polyacetylene film. There is shown by FIG. 2 at *a* the polyacetylene film-silicon wafer mask composite at 20, where 10 is the silicon substrate, 11 is the silicon oxide coating, 12 is the polyacetylene resist and 13 is the mask. The polyacetylene film was then exposed as shown in FIG. 2 *b* for about 10 to 15 seconds to an ultraviolet light source in the form of a GE AH4 lamp having a rating of about 100 watts at a distance of about 10 centimeters from the top surface of the polyacetylene film. The exposed polyacetylene film was then developed as shown by *c* by stirring the silicon wafer while immersed in toluene for about 4 minutes. The silicon wafer was then dried at about 60°C for 1 hour to strip the composite of solvent. FIG. 2 *a* illustrates how the exposed silicon oxide on the composite was then etched with a hydrogen fluoride etching solution containing an ammonium fluoride buffer. After 11 minutes, the silicon wafer composite was then washed and rinsed with water and air dried at room temperature. There was obtained a silicon wafer composite having a silicon base, and a silicon oxide coating etched in a configurational pattern and protected by the photoresist.

Silicon wafer is placed at the bottom of a cylinder horizontally disposed directly beneath a quartz window above in the wall of the cylinder. The cylinder is then flushed with nitrogen and a thermocouple is placed on the surface of the wafer. There is then introduced a mixture of oxygen and ozone having about ½ to 2% by weight ozone which is made by a silent discharge ozonizer, such as a Wellsbach Ozonizer. While the ozone containing oxygen stream is passed over the surface of the wafer at atmospheric pressure, an ultraviolet GE-H3T7lamp is turned on to provide ultraviolet light on the surface of the wafer through the quartz window. The distance of the lamp is about 2 inches from the surface of the wafer, which is sufficient to provide at least 100 milliwatts per square centimeter of light on the surface of the wafer as a result of being ballasted at 900 watts. The 0.15 micron photoresist present on the surface of the silicon wafer disappears as illustrated by FIG. 2 *e* in 10–15 seconds which is equivalent to about a rate of 10,000 A per minute. The temperature at the surface of the wafer, based on the reading of the thermocouple in accordance with the method of R. G. Johnston and R. P. Madden as cited previously shows that the average temperature at the surface is 210°C during the removal of the photoresist. The surface of the resist is then examined by Auger Emission Spectroscopy and found to be completely free of carbonaceous residue.

EXAMPLE 2

The procedure of Example 1 is repeated, except that 1¼ inch semiconductor wafers having photoresist at an average thickness of about 10,000 A are continuously introduced into the reaction zone on a carrier chain. An 8 foot long horizontal cylinder having a diameter of 6 inches is employed as a reaction chamber. A 1½ foot quartz window 4 inches wide is centrally disposed at the top of the steel cylinder. The carrier chain is a 4 inch wide woven metal steel belt. The aforementioned cylinder has an exhuast orifice at the top adjacent to the one side of the window and a duct for introducing a mixture of oxygen and ozone at the bottom on the other side of the quartz window. A nitrogen blanket is provided on both sides of the cylinder at either end to shield the operator from the ozone and oxygen atmosphere. There is employed four GE HT37 lamps and the distance from the wafers to the quartz windows is approximately 1 inch. The lamps are operated at about 900 watts each and the oxygen and ozone mixture is within the concentration shown in FIG. 1. Several semiconductor wafers having surface photoresist as described in Example 1 are continuously passed under the quartz window in the ozone and oxygen atmosphere. The surface temperature of the wafers are found by employing a thermocouple on one of the wafers passing through the reaction zone, which shows the temperature to be approximately 250°C. The wafers are allowed to pass through the reaction zone in approximately 1 minute which provides for an average rate of removal at about 10,000 A. Depending upon the thickness of the photoresist on the surface of the wafer, the speed of the carrier chain is varied so that the wafers are completely free of photoresist as determined by Auger Emission in accordance with the previously described procedure.

Although the above examples are limited to only a few of the many variables which can be employed in the practice of the invention, it should be understood the present invention can be employed to remove a variety of carbonaceous materials from various substrates in a static or continuous manner.

What I claim as new and desire to secure by Letters Patent of the United States is:

1. In the method for effecting the complete removal of carbonaceous material from the surface of a substrate involving the steps of, 1. preheating the substrate to a temperature of up to about 260°C, and
2. subjecting the heated substrate to an oxygen atmosphere containing a small percentage of ozone, the improvement which comprises simultaneously subjecting the substrate while in an unheated state to an oxygen atmosphere containing at least ¼ percent by weight of ozone and radiant energy having a wavelength of from 1800A to 3500A and an intensity of at least 100 milliwatts, whereby complete removal of the carbonaceous material from the surface of the substrate is effected in less time and the requirement of preheating the substrate and maintaining it at an effective carbonaceous material removal temperature prior to its exposure to the oxygen atmosphere containing a small percentage of ozone is eliminated.

2. The method of claim 1 where the oxygen containing atmosphere has from ½% to 2% ozone.

3. The method of claim 1 where the substrate is a silicon wafer and the carbonaceous material is a photoresist.

4. The method of claim 1 where the substrate is conveyed through the reaction zone in a continuous manner.

5. A method for effecting the removal of photoresist from the surface of semiconductor wafer which comprises continuously conveying semiconductor wafer through a reaction zone having an oxygen containing atmosphere with ¼% to 2% of ozone based on the weight of oxygen while continuously subjecting said semiconductor wafer to radiant energy which is sufficient to maintain the temperature of the interface of the surface of the wafer and the oxygen containing atmosphere at at least about 200°C during the time the wafer is conveyed through said reaction zone, where the radiant energy is generated by a medium vapor pressure mercury lamp capable of emitting ultraviolet radiation at a wavelength of from about 1,800 A to 3,500 A and an intensity of at least 100 milliwatts per square centimeter.

6. A method in accordance with claim 5, where the semiconductor wafer is a silicon wafer.

* * * * *